May 24, 1966 — J. MADL, JR — 3,252,400
MEANS PROVIDING A COORDINATED AIR FLOW IN AN ENCLOSURE
Filed Feb. 24, 1964 — 3 Sheets-Sheet 2
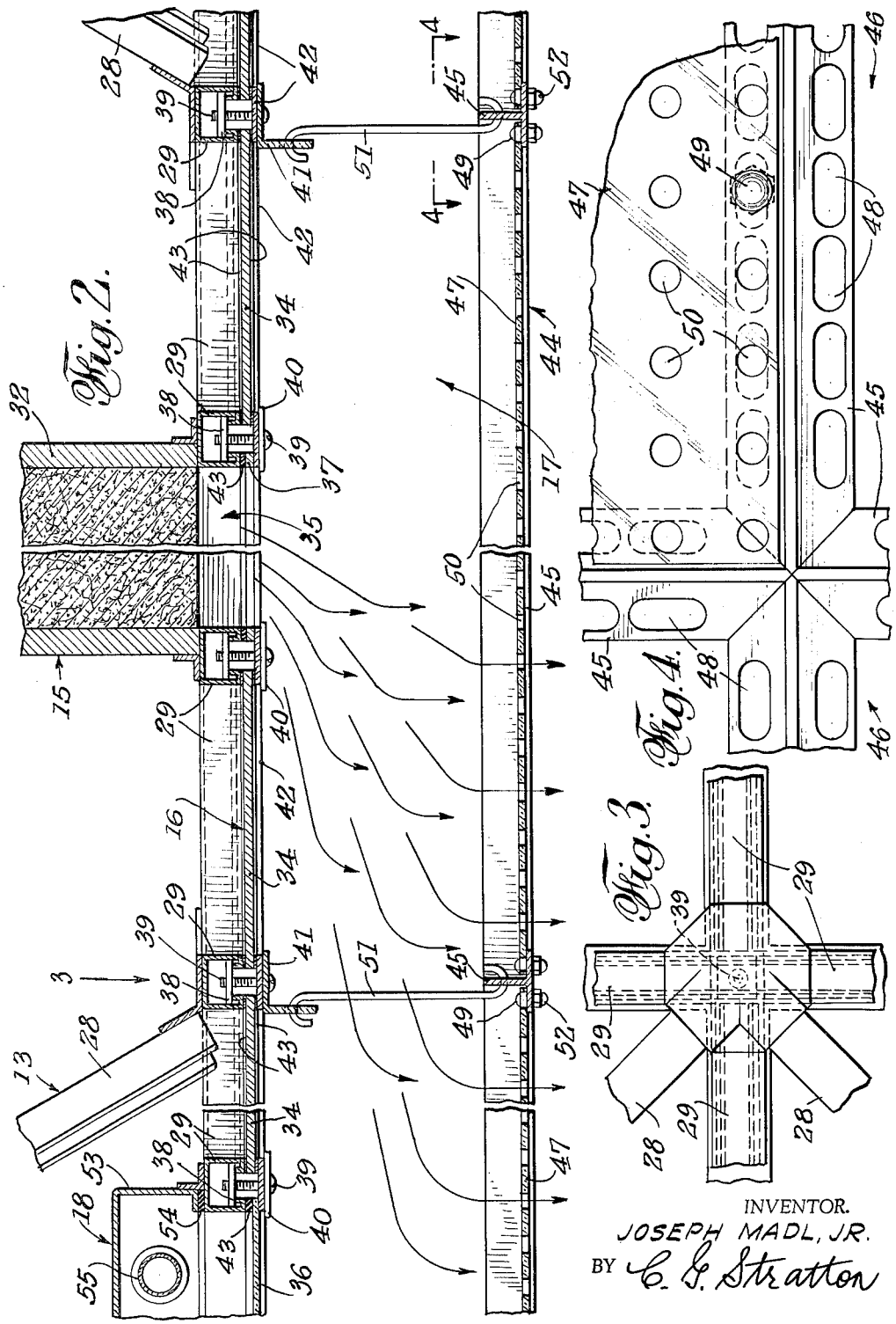
INVENTOR.
JOSEPH MADL, JR.
BY C. G. Stratton
ATTORNEY

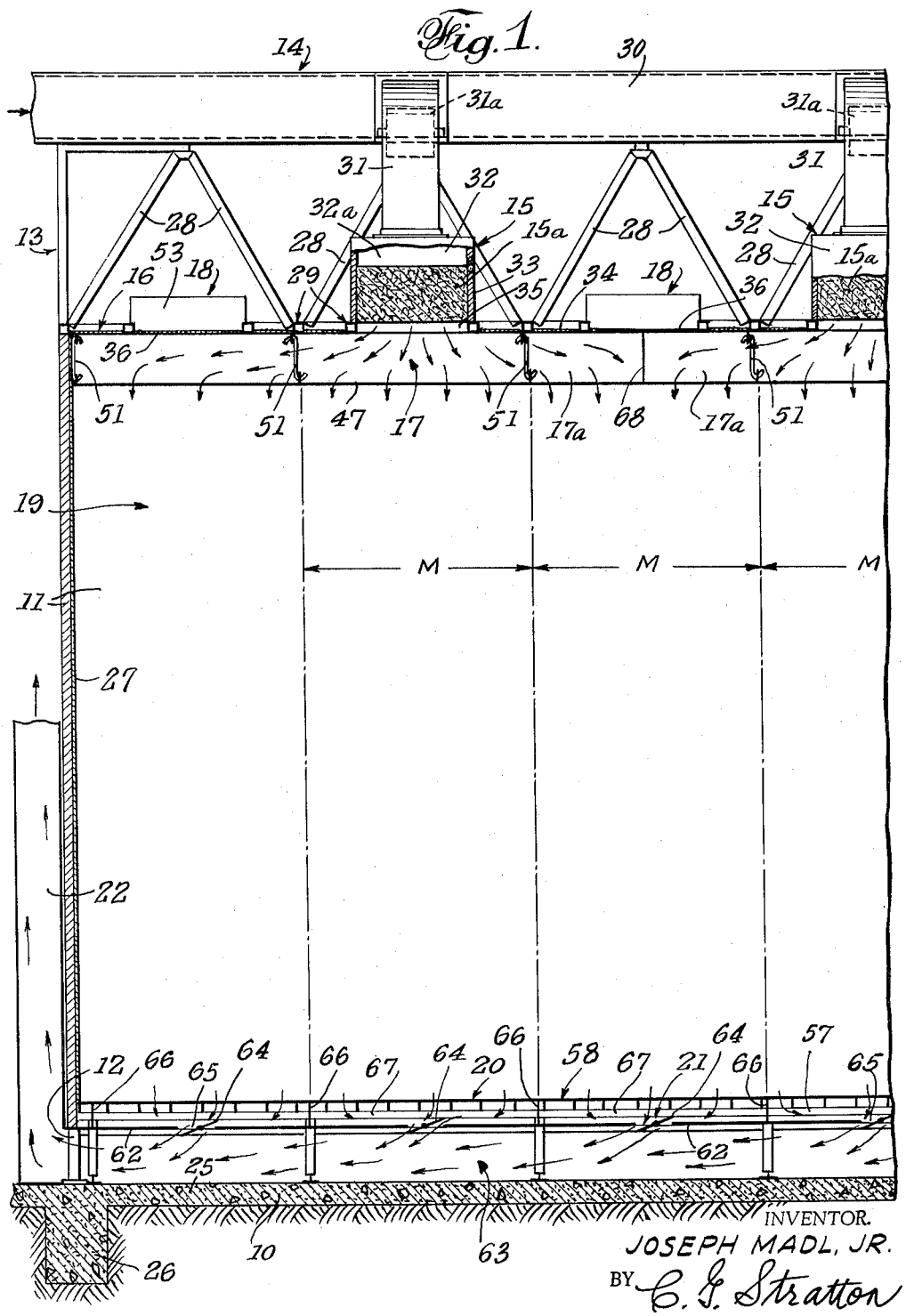

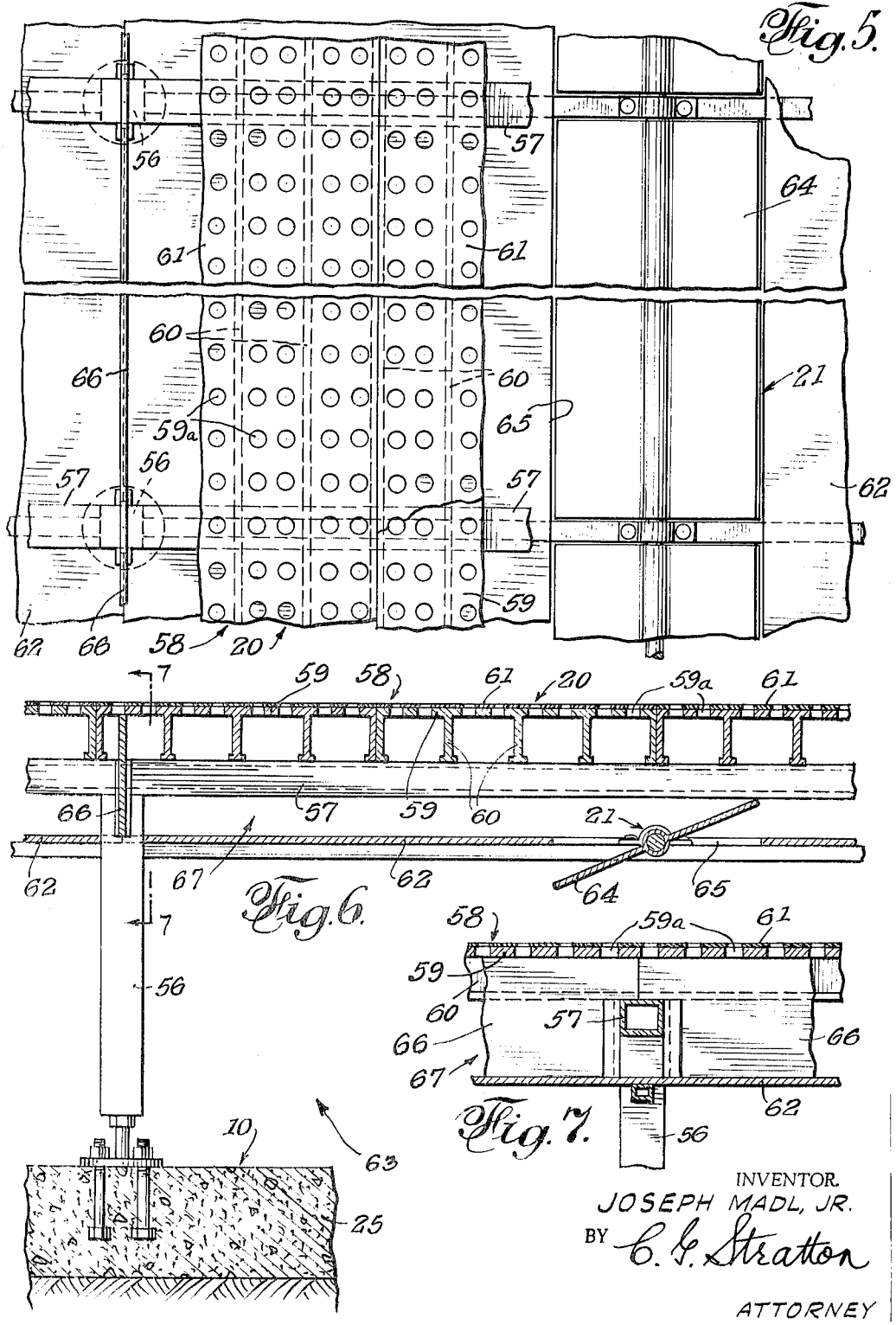

United States Patent Office 3,252,400
Patented May 24, 1966

3,252,400
MEANS PROVIDING A COORDINATED AIR
FLOW IN AN ENCLOSURE
Joseph Madl, Jr., 990 Volante Drive, Arcadia, Calif.
Filed Feb. 24, 1964, Ser. No. 346,899
10 Claims. (Cl. 98—40)

This invention relates to means for providing a coordinated air flow in an enclosure.

Certain enclosures or rooms, such as industrial areas in which complex miniature units are handled and/or assembled; hospital rooms, particularly operating rooms; and other areas that are desired to be retained free of dust and other contaminants, in a condition of a high degree of cleanliness or of sterility, and/or in a condition providing a degree of comfort as desired, present problems involving such a coordinated and synchronized air flow over a wide velocity range that desired conditions of cleanliness and/or sterility may be achieved.

An object of the present invention is to provide novel and improved means for providing an air flow, as above characterized, that in a high degree solves the problems that presently prevent attainment of optimum cleanliness and sterility conditions, as above mentioned.

Another object of the invention is to provide means, as above characterized, that may be incorporated in a modular arrangement in area sizes that are small, large, simple in form, as well as complex.

Another object of the invention is to provide means including a flow of thoroughly cleaned air from above and in a downward direction uniformly distributed throughout the area, and maintaining the downward shower-like air flow in a manner preventing recirculation of the air in an upward direction, thereby obviating return of "washed down" contaminants and undesired incorporation thereof into the air flow thereabove.

Another object of the invention is to provide means, as above characterized, that is so located and arranged as to be isolated from the area which it serves, thereby reducing noise an vibration as well as providing for easier access for servicing.

A further object of the invention is to provide an area-cleaning air flow system that, by effecting complete separation of air inlet and air exhaust phases thereof, enables flexibility of operation with respect to f.p.m. air movement through the area served, pressure of air, and other air-movement characteristics, particularly minimal turbulences.

A still further object of the invention is to provide air flow means of modular form in which provisions for lighting or otherwise treating the air are incorporated in combination with clean air inlet means that provides the uniformly dispersed downward flow characteristics hereinbefore mentioned.

A still further object of the invention is to provide means, as above, that provides for complete regulatory control of air input and air discharge phases of the system, thereby enabling compensation in the flow for special conditions, such as equipment interference, personnel concentration, and the like.

A yet further object of the invention is to provide a synchronized and coordinated air flow that produces an air curtain barrier between equipment and personnel to avoid, or at least minimize, mutual contamination.

A yet further object of the invention is to provide a uniformly dispersed air flow in an area in which the flow follows a vertical path throughout the areal extent of the area, thereby obviating transfer of contaminants from one item of equipment or from one person to another item of equipment or person, each said item or person being encompassed within an air shower having minimal lateral movement.

A yet further object of the invention is to provide means for exhausting or effecting removal of an air shower type of air flow from an area at the floor of said area, thereby insuring prompt removal from the area of airborne particles, and further aiding removal from the area of material that had settled onto the floor.

A yet further object of the invention is to provide means, as above characterized, that effects such control of the air flowing through a room that the degree of comfort may be provided, as desired, enabling improved productivity of personnel in an environment of uniform temperature and humidity.

This invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description and which is based on the accompanying drawing. However, said drawing merely shows and the following description merely describes, one embodiment of the present invention, which is given by way of illustration or example only.

In the drawing, like reference characters designate similar parts in the several views.

FIG. 1 is a vertical sectional view of the present gravity coordinated and synchronized air flow means.

FIG. 2 is an enlarged and broken sectional view of a portion of the air inlet means that is shown in FIG. 1.

FIG. 3 is a top plan view as taken in the direction of the arrow 3 of FIG. 2.

FIG. 4 is a fragmentary plan view as taken on the line 4—4 of FIG. 2, drawn to an enlarged scale.

FIG. 5 is a broken plan view showing the floor and air outlet portion of the present means.

FIG. 6 is a broken vertical sectional view thereof, the same being an enlargement of a portion of the lower part of FIG. 1.

FIG. 7 is a sectional view as taken on the line 7—7 of FIG. 6.

The present means is adapted to be incorporated in an existing building having a room or rooms, or similar spaces, of adequate height to house the same with suitable head clearance (eight feet or eight feet six inches, for example), or to be constructed, as shown in the drawings, as an initially designed building component.

The means that is illustrated comprises, generally a foundation 10, enclosing walls and/or partitions 11 supported on the foundation by suitable piers or comparable supports 12, a superstructure or comparable upper support frame 13 supported by said walls or reinforcements thereof, air inlet duct means 14 supported by said frame 13, filter units 15 receiving air flow from the duct means, a ceiling 16 at a level below both the duct means and the filter units and also supported by the walls 11 and embodying therein a plenum 17 into which the air exiting from the filter units 15 is discharged, means 18 carried by the ceiling in areas thereof between adjacent filter units 15 for providing illumination, heating or vaporization, or otherwise treating the area 19 beneath the ceiling 16, a floor structure 20 supported from the foundation 10 and including damper means 21 for controlling air flow through the floor from the area 19, and an outlet conduit 22 from the floor structure 20.

The foundation 10 is shown as a concrete slab 25 with suitable reinforcing footings 26, provided and distributed according to the size and shape of the present means.

The walls 11 may be generally conventional. However, it is preferred that the same be lined or covered on their inner faces 27 with a smooth, hard non-absorbing material, as paint, varnish, enamel, paneling and the like, the intent being to provide wall surfaces that do not resist downward flow of air touching the same. The piers 12 may be of any suitable form and spaced as required to adequately support the walls.

The upper frame 13 may be constructed in various ways, providing the chord struts 28 thereof are in truss-like arrangement to provide supports for the inlet duct means 14. Said members 28 are shown as supported on a network of web struts 29. As can be seen best in FIG. 2, the struts 29 may be arranged in a grid pattern conforming to the ceiling pattern or design. The chord struts 28 may be arranged in repeated formation, as shown in FIG. 1.

The air inlet duct 14 may comprise a single conduit 30 (or more, if desired) and a complement of branch ducts 31, each of which terminates in an elongated housing 32 that is supported on the network of web struts 29 so that the bottom of each housing is open in a downward direction without interference by any of the struts 29. One or both side walls of each housing 32 is provided with a hinged access door 33 or other removable panel to enable ready replacement or servicing of the filters 15a in the filter units 15. The latter occupy the housings 32 with an elongated space 32a thereabove. Said filters 15a in each filter unit 15 are in the path of downward flow of air from the ducts 31 and outwardly from the bottom openings in the housings 32. The spaces 32a allow the air from said ducts to spread out over the full area of the filters 15a so the air outlet flow is uniform.

The housings 32 may not only house filter units of suitable cleanisng efficiency, but may, in addition, house lamps providing radiation beyond both ends of the visible spectrum between the filter pack units. The latter may be both coarser and final filters, as needs dictate. The lamps mentioned are merely illustrative of means that render the air sterile.

The ceiling 16 is connected to said web struts 29 of the upper frame 13 and is carried thereby. The frame 13 may be replaced by a suitable suspension means, if desired. As best seen in FIG. 2, ceiling panels 34 connected to and and extend between some of the adjacent struts 29, a space 35, in register with the opening in each filter housing, between other adjacent struts 29, provides passage for air from the filter units into the plenum 17, and a transparent or other suitable panel 36 extends between still other adjacent struts 29 beneath the means 18. It will be clear that the panels 34 and 36 span the entire ceiling area together with the network of web struts 29, except at the spaces 35 beneath the filter units, which act to close the ceiling from above against flow of air into the plenum except through the filter units.

The amount of air discharged from the filter means 15 at the openings 35 may be varied individually for each duct 31 by means of a valve or damper 31a in each said duct.

Said panels 34 and 36, as well as a space-framing strip 37 around each space 35, are connected to the struts 29 as follows: Each strut 29 is preferably of U-form with the ends of the flanges thereof inwardly return bent, as in FIG. 2, to form supports for bridge plates 38 that are threadedly engaged by screws 39, the heads of which engage seal caps 40 or a flange of angles 41. It will be clear that said plates 38 and either caps 40 or angles 41 clamp the marginal edges of ceiling panels 34, panel 36, or frame strips 37, as the case may be, against the lower doubled-back ends of the flanges of the struts 29. The ends of joint-closing strips 42 are interposed between said panels 34 and 36 or strips 37, the same closing the seams formed by said panels. Said ends of the joint-closing strips 42 are preferably interengaged so as to form an air-tight seal in the areas through which the screws 39 extend. Wherever required, seal strips 43 may be provided to seal the connections thus made between the struts 29 and the ceiling panels 34 and 36 and framing strip 37, to prevent passage of air from the space above the ceiling to the plenum 17. Thus, only air from the filter units 15 is conducted to the plenum.

The ceiling 16 further includes a false ceiling 44 which is shown as a grid structure formed of T-bars 45 that preferably define rectangular spaces 46 which are spanned by transparent or translucent perforated panels 47. Slots 48 or the like in the support flanges of the T-bars 45 are used by suitable bolts or studs 49 for securing the panels 47 to the T-bars 45. It is contemplated that the perforations 50 at the margins of the panels 47 will serve, in connection with the slots 48, to effect a satisfactorily secure locking of these panels to the T-bars.

It will be seen that the above-described false ceiling 44 is suspended by means of hangers 51 and from the angles 41, the length of said hangers measuring the depth of the plenum. Also, that the panels 47 may be removed and replaced from beneath without disturbing the grid structure 45, the studs 49 being carried by the panels, and nuts 52 being applied to the downwardly projecting ends of said studs to secure the panels.

The means 18 is shown as a fluorescent lamp 53 that is so mounted on adjacent web struts 29 as to insure that the mounting is sealed, a gasket 54 being shown for this purpose. Said housing 53 and the lamp 55 housed therein are intended, of course, for illumination purposes. This unit may comprise a heating, vaporizing or other device for treating the air in the plenum 17. In such case, the panel 36 may comprise a screen or other foraminous member instead of the transparent panel that is shown.

The floor structure 20 is shown as a plurality of posts 56 in preferably rectilinear arrangement, horizontal members 57 extending across the tops and supported by the posts, the same extending in one direction with respect to the length and breadth of the building, and a complement of floor beams 58 supported by the members 57 and extending transversely thereto. Said beams are not necessarily fastened to the members 57, retaining their operative position due to interfit among them. Hence, one or more of the beams may be removed for access therebeneath or for replacement.

Each beam 58 is preferably formed of a suitable metal to have a perforated top 59 and a series of downwardly directed ribs or webs 60 that have support contact with the tops of the members 57. It will be seen that the ribs 60 extend in a direction transverse to the members 57. A vinyl or similar covering 61, with perforations in register with the perforations of the beam tops 59, is fixedly applied to the beams to provide a desirable floor surface easily cleaned and maintained.

The area of floor 20 and the false ceiling 44 may be the same size or may vary. The total area of the perforations 50 in the ceiling and 59a in the beam tops 59 may be the same and, depending on the general conditions and the type or speed of downward air flow desired, the perforation area at the ceiling may be larger or smaller than the perforation area at the floor. In cases where electrical or other fixtures are installed in certain portions of a floor, the perforations may be omitted and, if desired, compensation made therefor by an increase in perforations or sizes thereof in other portions of the floor. The perforations 59a are preferably of small, practical size to produce the feeling to persons using the same that the floor is solid rather than perforated.

The floor structure 20 includes a horizontal wall 62 beneath and parallel to the floor beams, said wall 62 combining with the foundation 10 or similar base surface to form a duct 63 which receives the air flow passing downwardly through the perforated floor.

The damper means 21 is provided in the wall 62 to regulate the air flow from the area beneath the floor beams to the duct 63. In this case, the means 21 comprises a plurality of dampers 64 having air flow control through slots 65 in the wall 62 to effect regulation of flow from areas defined between partitions 66 that divide the space between the floor beams 58 and the duct 63 into a series of independent outlets 67 to the damper means 21. It will be understood that independent and selective regulation of the dampers 64 enables control of air movement in the portions of room area 19 vertically aligned with the respective outlets 67. Thus, although the entire room area 19 is filled with a shower of air from above, any desired portion or portions of said shower may be slowed or speeded with respect to the others.

The outlet conduit 22 effects a removal of the air from the duct 63 wholly independent from the inlet conduit 14. The removed air may be treated before venting to atmosphere in instances where the same is unduly greatly contaminated. The duct 63 may have an outlet conduit or conduits 22 that are placed where desired around the walls 11 of the building.

It will be noted that the means above described is arranged so as to provide a modular construction designated by the dimensions M in FIG. 1, the same being coordinated with the width of outlets 67, as above described. As shown, partitions 68 in the middle of each module that has the means 18 represent the lateral limits of the plenum sections 17a into which the plenum 17 is divided.

It will be noted that there is a total absence of means that may effect or impose a lateral or disturbing force on the curtain of air. Thus, even at low velocities (two to five f.p.m.) the pressure of the inlet air, the gravitational force on the air in the room, and the lowered pressure in the exhaust duct, as the air expands after passing through the perforations 59a, all combine to keep the air flow coordinated and in a streamline pattern, as above indicated.

The floor beams 58 my be removed to enable thorough cleaning, in any suitable manner, of the structural means therebeneath.

Operation

The air provided in the plenum 17 may move at a speed as high as one hundred f.p.m. and may move as slowly as two to five f.p.m., as required. In any case, the air exiting through the perforations 50 has a confined directly downward movement due to the lateral confinement imposed by the partitions 68 and by the end wall 11.

The resulting air shower in the room space 19 will have a downward movement toward the floor as controlled by the setting of the several dampers 64; the greater the opening provided by each damper, the greater relative gravitational speed of the air toward the independent outlet above each respective damper. Although the air flow is gaseous and, therefore, highly elastic, there is little or no tendency for the columns of air above the floor and in the line with each outlet 67 to spread or move laterally. Even in cases where the same occurs, it has minor effect on the shower-like course above outlined.

It will be noted that all of the means that provides the air, lights or otherwise treats the room area 19, and all of the means that exhaust the air that moves below the floor level of area 19, are located outside the area 19. Also, that only the supplied air reaches area 19, and that the same, due to its continuous downward movement, cannot recirculate to the area above the plenum.

While the foregoing has illustrated and described what is now contemplated to be the best mode of carrying out the invention, the construction is, of course, subject to modification without departing from the spirit and scope of the invention. Therefore, it is not desired to restrict the invention to the particular form of construction illustrated and described, but to cover all modifications that may fall within the scope of the appended claims.

Having thus described the invention, what is claimed and desired to be secured by Letters Patent is:

1. Means to provide a coordinated air flow in an enclosed area, said means comprising:
   (a) a ceiling structure embodying an air-impervious ceiling and a perforated false ceiling spaced below and suspended from the ceiling to define a plenum therebetween,
   (b) partitions dividing the plenum into sections of modular width,
   (c) means disposed above the air-impervious ceiling to conduct and downwardly discharge independent flows of treated air into each plenum section for gravitational movement through the false ceiling into and downwardly through the enclosed area in columns of air generally conforming to the size of the plenum sections, and
   (d) a perforated floor for said enclosed area to pass to exhaust the air moving downwardly through the enclosed area.

2. Means according to claim 1 in which the means to conduct and discharge the independent flows of treated air comprises horizontally spaced air ducts each provided with an air-filtering unit, and means carried by the ceiling above said plenum to illuminate the enclosed area, the false ceiling comprising light-passing material to pass the light from the illuminating means.

3. Means to provide a coordinated air flow in an enclosed area, said means comprising:
   (a) a ceiling structure embodying an air-impervious ceiling and a perforated false ceiling spaced below and suspended from the ceiling to define a plenum therebetween,
   (b) partitions dividing the plenum into sections of modular width,
   (c) means disposed above the air-impervious ceiling to conduct and downwardly discharge independent flows of treated air into each plenum section for gravitational movement through the false ceiling into and downwardly through the enclosed area in columns of air generally conforming to the size of the plenum sections,
   (d) a perforated floor for said enclosed area,
   (e) a plurality of independently adjustable dampers beneath said floor and vertically beneath the several air columns to control the flow rate of said air columns, and
   (f) an exhaust conduit to pass the flow passing through the damper means.

4. Means according to claim 3 in which the floor comprises side-by-side beams of metal with a perforated coating of plastic.

5. Means to provide a coordinated air flow in an enclosed area, said means comprising:
   (a) a ceiling structure embodying an air-impervious ceiling and a perforated false ceiling spaced below and suspended from the ceiling to define a plenum therebetween,
   (b) partitions dividing the plenum into sections of modular width,
   (c) means disposed above the air-impervious ceiling to conduct and downwardly discharge independent flows of treated air into each plenum section for gravitational movement through the false ceiling into and downwardly through the enclosed area in columns of air generally conforming to the size of the plenum sections,
   (d) a perforated floor for said enclosed area,
   (e) a horizontal exhaust conduit beneath the floor and spaced therefrom,
   (f) partitions dividing said space into separate spaces conforming to the modular widths of the plenum sections, and (g) a plurality of independently adjustable dampers vertically beneath the separate spaces and controlling flow rates from said separate spaces into the horizontal conduit.

6. Means for providing a coordinated air flow through an enclosed area,
(a) an air-impervious ceiling above said area,
(b) means to conduct treated air to and through said ceiling, said means comprising horizontal, spaced, independent air-filtering units,
(c) means occupying spaces in said ceilings between the treated-air-conducting means to provide illumination for said enclosed area,
(d) a perforated and transparent false ceiling spaced below the ceiling and defining a plenum between said ceilings to receive the discharges of the treated-air-conducting means,
(e) a set of suspenders to hang the false ceiling from the ceiling, and
(f) a set of partitions dividing the plenum into plenum sections, the air, thereby, passing through the perforated false ceiling in columns of air entering the enclosed area,
(g) the treated-air-conducting means being disposed above the ceiling and comprising separate units to conduct air to the plenum sections separately.

7. In means according to claim 6, a truss structure to support both the air-conducting means and the air-impervious ceiling.

8. Means to provide a coordinated air flow in an enclosed area, said means comprising:
(a) a ceiling structure embodying an air-impervious ceiling and a perforated false ceiling spaced below and suspended from the ceiling to define a plenum therebetween,
(b) partitions dividing the plenum into sections of modular width,
(c) means disposed above the air-impervious ceiling to conduct and downwardly discharge independent flows of treated air into each plenum section for gravitational movement through the false ceiling into and downwardly through the enclosed area in columns of air generally conforming to the size of the plenum sections,
(d) a perforated floor for said enclosed area,
(e) a plurality of independently adjustable dampers beneath said floor and vertically beneath the several air columns to control the flow rate of said air columns, and
(f) an exhaust conduit to pass the flow passing through the damper means,
(g) the pressure of the air discharged from the plenum, together with the force of gravity on the air moving in the enclosed area, and combined with the lowered pressure afforded by the air movement in the exhaust conduit, combining to coordinate the air flow into a streamline curtain-like pattern at all velocities of flow.

9. Means to provide a coordinated air flow in an enclosed area, said means comprising:
(a) a ceiling structure embodying an air-impervious ceiling and a perforated false ceiling spaced below and suspended from the ceiling to define a plenum therebetween,
(b) partitions dividing the plenum into sections of modular width,
(c) means disposed above the air-impervious ceiling to conduct and downwardly discharge independent flows of treated air into each plenum section for gravitational movement through the false ceiling into and downwardly through the enclosed area in columns of air generally conforming to the size of the plenum sections, and
(d) a perforated floor for said enclosed area to pass to exhaust the air moving downwardly through the enclosed area,
(e) said floor comprising a plurality of perforated side-by-side beams adapted for removal independently to expose the damper means and exhaust conduit therebeneath.

10. Means to provide a coordinated air flow in an enclosed area, said means comprising:
(a) a ceiling structure embodying an air-impervious ceiling and a perforated false ceiling spaced below and suspended from the ceiling to define a plenum therebetween,
(b) partitions dividing the plenum into sections of modular width,
(c) means disposed above the air-impervious ceiling to conduct and downwardly discharge independent flows of treated air into each plenum section for gravitational movement through the false ceiling into and downwardly through the enclosed area in columns of air generally conforming to the size of the plenum sections,
(e) the air-conducting and -discharging means including a plurality of ducts to conduct and discharge air into each plenum section independently, and
(f) a damper to control flow in each said duct independently.

References Cited by the Examiner

UNITED STATES PATENTS

| | | | |
|---|---|---|---|
| 2,912,918 | 11/1959 | Mead | 98—115 |
| 2,952,341 | 9/1960 | Weiler | 189—34 |
| 3,158,457 | 11/1964 | Whitfield | 98—33 |
| 3,168,030 | 2/1965 | Wilhelmsson | 98—115 |

ALDEN D. STEWART, *Primary Examiner.*

JOHN F. O'CONNOR, *Examiner.*